United States Patent
Kolcz et al.

(10) Patent No.: US 7,788,292 B2
(45) Date of Patent: Aug. 31, 2010

(54) RAISING THE BASELINE FOR HIGH-PRECISION TEXT CLASSIFIERS

(75) Inventors: Aleksander Kolcz, Kirkland, WA (US); Wen-tau Yih, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 372 days.

(21) Appl. No.: 11/955,007

(22) Filed: Dec. 12, 2007

(65) Prior Publication Data

US 2009/0157720 A1  Jun. 18, 2009

(51) Int. Cl.
*G06F 17/30* (2006.01)
(52) U.S. Cl. .................................. 707/803; 715/200
(58) Field of Classification Search ............ 707/100, 707/802, 803, 805, 999.001; 715/200
See application file for complete search history.

(56) References Cited

U.S. PATENT DOCUMENTS

| | | | |
|---|---|---|---|
| 4,833,610 A | 5/1989 | Zamora et al. | |
| 5,297,039 A | 3/1994 | Kanaegami et al. | |
| 6,785,669 B1 | 8/2004 | Aggarwal et al. | |
| 6,810,376 B1 | 10/2004 | Guan et al. | |
| 6,990,628 B1 | 1/2006 | Palmer et al. | |
| 7,260,773 B2 | 8/2007 | Zernik | |
| 7,577,709 B1 * | 8/2009 | Kolcz ........................ | 709/206 |
| 2003/0172357 A1 * | 9/2003 | Kao et al. .................. | 715/529 |
| 2004/0024583 A1 | 2/2004 | Freeman | |
| 2004/0181527 A1 | 9/2004 | Burdick et al. | |
| 2005/0210003 A1 | 9/2005 | Tsay et al. | |
| 2006/0117228 A1 | 6/2006 | Theimer et al. | |

OTHER PUBLICATIONS

Vasileios Hatzivassiloglou, et al. Detecting Text Similarity over Short Passages: Exploring Linguistic Feature Combinations via Machine Learning http://acl.ldc.upenn.edu/W/W99/W99-0625.pdf. Last accessed Oct. 4, 2007, 10 pages.

Rada Mihalcea, et al. Corpus-based and Knowledge-based Measures of Text Semantic Similarity, American Association for Artificial Intelligence, (www.aaai.org) 2006 http://www.cs.unt.edu/~rada/papers/mihalcea.aaai06.pdf. Last accessed Oct. 4, 2007, 6 pages.

Jun-Peng Bao, et al. Quick asymmetric text similarity measures. 0-7803-7865-2/03 IEEE, Proceedings of the Second International Conference on Machine Learning and Cybernetics, Xi'an, Nov. 2-5, 2003. http://ieeexplore.ieee.org/Xplore/defdeny.jsp?url=/iel5/8907/28247/01264505.pdf&htry=1?code=18. Last accessed on Oct. 4, 2007, 6 pages.

* cited by examiner

*Primary Examiner*—Cheryl Lewis
(74) *Attorney, Agent, or Firm*—Lee & Hayes, PLLC

(57) ABSTRACT

The claimed subject matter provides systems and/or methods for normalizing document representations for use with Naïve Bayes. The system can include devices and components that determine norms associated with documents by aggregating absolute term weight values associated with the documents, and further ascertain term weights for features associated with the documents, and thereafter divides the term weights for the features associated with the documents with the norms associated with the documents to produce a normalized document representation that can be utilized by arbitrary linear classifiers.

20 Claims, 7 Drawing Sheets

RAISING THE BASELINE FOR HIGH-PRECISION TEXT CLASSIFIERS

BACKGROUND

Empowering people to make well-informed decisions has become increasingly important in today's fast paced environment. Providing individuals with relevant and timely information is an essential element in facilitating such well-informed decisions. However, certain information that is noise to some may be valuable to others. Additionally, some information can also be temporally critical and as such there may be significant value associated with timely delivery of such information. Moreover, with the growth of computer and information systems, and related network technologies such as wireless and Internet communications, ever increasing amounts of electronic information are communicated, transferred and subsequently processed by users and/or systems. As an example, web browsers have become a popular application amongst computer users for generating and receiving content. With the advent of the Internet, for instance, exchanging content (e.g., messages, files, web pages, etc.) has become an important factor influencing why many people acquire computers. Nevertheless, with the heightened popularity of web browsers and other information transfer systems, problems have begun to appear with regard to managing, processing, and rendering increasing amounts of content.

There are many applications for automatic classification of items such as email, documents, images, and recordings. To address this need, a plethora of classifiers have been developed based, for example, on probabilistic dependency models learned from training data. Examples of such models can include logistic regression models, decision tree models, support vector machines, neural networks, Naïve Bayes, and the like.

Naïve Bayes classifiers to date have been one of the most widely utilized classifiers ever developed in the text domain even though the classifier is generally recognized as providing solutions that are just "good enough". Nevertheless, Naïve Bayes classifiers are utilized by a plethora of classification applications, typically to provide a lower bound for the classification while the upper classification bounds are generally handled by more arcane and abstruse methodologies despite the fact that utilization of such techniques in some cases ekes out only marginal gains in terms of cost and time over utilization of the ubiquitous Naïve Bayes classifier, while in other instances gains accrued can be dependent on factors such as document representation and precision requirements (e.g., if high precision is not required, many standard versions of Naïve Bayes classifiers can perform adequately.

SUMMARY

The following presents a simplified summary in order to provide a basic understanding of some aspects of the disclosed subject matter. This summary is not an extensive overview, and it is not intended to identify key/critical elements or to delineate the scope thereof Its sole purpose is to present some concepts in a simplified form as a prelude to the more detailed description that is presented later.

Many application areas of text classifiers demand high precision and it is common to compare prospective solutions to the performance of Naïve Bayes—a baseline that typically can be easy to improve upon. In order to provide more robust Naïve Bayes classifiers (e.g., Naïve Bayes classifiers applicable to, and capable of classifying, most document representations regardless of degree of precision required), the claimed subject matter can provide a link between Naïve Bayes and the logarithmic opinion pooling of the mixture-of-experts framework, which dictates a particular type of document length normalization. Motivated by document-specific feature selection, the claimed subject matter in accordance with an aspect can employ monotonic constraints on document term weighting, which can be an effective method of fine-tuning document representation.

In accordance with a further aspect, the claimed subject matter can normalize document representation for use with Naïve Bayes which can comprise computing the norm of each document by summing the absolute values of term weights, dividing each term weight by the norm (e.g., known as the L1 norm), training the Naïve Bayes model using the normalized representation, and using the normalized representation when applying the trained Naïve Bayes model to new data.

In a further aspect of the claimed subject matter, a multi-stage technique can be employed to adjust term weights for Naïve Bayes where the process can be primed with an original weight representation, the Naïve Bayes model can then be computed using a given term-weight representation, the original term weights multiplied by the absolute values of the corresponding model weights for a prescribed number of times or until convergence occurs.

In a further illustrative aspect, the subject matter as claimed can inductively perform document-specific feature selection where a classifier can be trained using the original feature representation which can result in a first model, model A, then for each training document, the terms can be ranked according to the absolute values of model A weights and the top-N weights selected. A new classifier, model B, can then be induced using the reduced document representation. For normal operation, the top-N terms of a test document can be selected using model A and the resulting reduced document can be classified employing model B.

In accordance with yet a further aspect, the claimed subject matter can optimize non-negative term weights (e.g., different from model weights) under a rank preserving constraint where original term weights can be acquired (e.g., assumed to be non-negative), a model learnt and evaluated, term weights adjusted in a way that preserves their ranking and improves model performance for a prescribed number of iterations or until convergence has been achieved.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
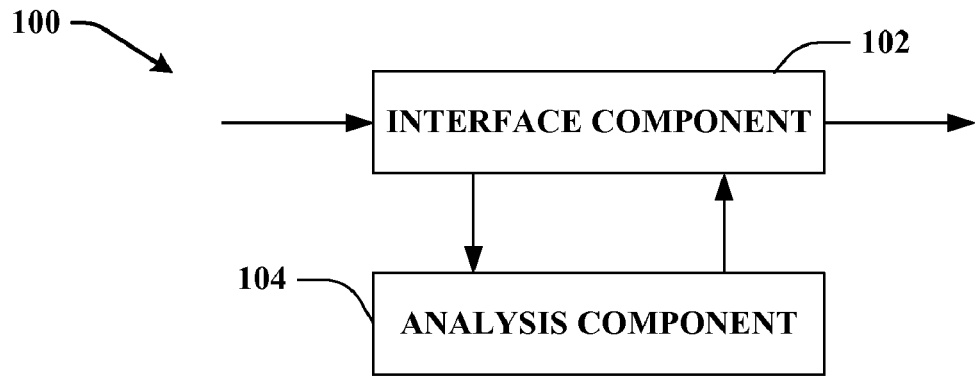
FIG. 1 illustrates a machine-implemented system that effectuates and facilitates improving Naïve Bayes performance in text applications demanding high precision in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Practical classification problems in the text categorization (TC) domain often involve sharp constraints with respect to the precision, false-positive or false-negative rates. While overall accuracy is generally important, a spam filtering solution, for instance, can be unacceptable if it destroys or erroneously delivers legitimate email as spam even at a small rate. In a cost-sensitive classification framework, significant asymmetry can be perceived in the way different miscalculation mistakes are weighted. In this context, classification system can be beneficial only as long as the probabilities of certain types of errors are sufficiently low. Although to date, a large amount of research emphasis has been devoted to improving the quality of text classification techniques, the focus has primarily been on the overall accuracy or global quality metrics such as the error rate, F-measure, precision-recall break-even, or area under the ROC curve. Methods that improve the global metrics can also improve classification performance in the region of high specificity, but typically they are rarely investigated in this context.

The claimed subject matter in accordance with an aspect focuses on the aspects of document representation, and in particular on the impact of document sparsity, term weighting and length normalization in problems demanding high specificity. The subject matter as claimed concentrates on Naïve Bayes, which generally is a highly scalable learner and for which a number of recent improvements have been proposed, making it quite competitive with more complex techniques such as Support Vector Machines (SVMs).

In the context of the Naïve Bayes classifier, it has been suggested that post-induction document-specific feature selection tends to outperform traditional document-independent approaches in applications with low tolerance for false positive errors. Accordingly, the claimed subject matter in order to avail itself of such benefits can make document-specific feature selection part of the induction process. Additionally, the subject matter as claimed can extend the concept of local sparsity control to the area of term weighting. Such a soft approach (e.g., down weighting of less relevant features rather than their complete elimination) to the reduction of active document terms can provide substantial improvements to classification performance and typically tends to outperform hard feature selection. Moreover, when soft and hard feature selection approaches are combined, feature elimination generally leads only to marginal improvements.

Document length normalization can provide a mechanism for controlling the influence of any particular term on a document by document basis. Although it has been widely used with other text classifiers, its use with Naïve Bayes is a recent development and generally not well understood. Nevertheless, certain types of length normalization cast Naïve Bayes into the mixture-of-experts framework, and as utilized in the claimed subject matter, can provide a solid basis for this type of transformation, explain its effectiveness for this classifier, and illustrates that for Naïve Bayes, L1 normalization can be more appropriate than the traditional L2 normalization.

Experimental findings with several email collections, for example, and utilizing the claimed subject matter has found that with appropriate document representation, Naïve Bayes can compete and even outperform state-of-the-art learners, such as Logistic Regression and Support Vector Machines (SVMs). This is particularly true for data sets with some degree of class noise, which is typical in practical applications of text mining. These improvements in performance of Naïve Bayes typically do not take away its attractiveness in terms of speed of learning and ease of implementation.

Typically, Naïve Bayes does not perform well in text classification tasks that require high precision for at least the following reason. For example, consider a binary classification task defined over domain X, where based upon a training set $$\{d_i, y_i\}: X_i \epsilon X, y_i \epsilon \{C, \overline{C}\}, i=1 \ldots T$$

the objective is to find a mapping $\{f: X \rightarrow \{C, \overline{C}\}\}$ such that its expected loss is sufficiently low. The definition of loss can be application-specific and often is taken to be the error rate. In many problems, the misclassification costs are asymmetric and in some cases the cost of one type of error can be high enough to demand very low, or even near zero, probability of occurrence. In some web search applications, for example, it is required that the top-N results returned of the user query have very high precision even if this significantly restricts the number of potentially relevant responses that can make it to the top-N. In spam detection, for instance, users have low tolerance for false positive errors and accept e-mail filtering solutions as long as the chance of losing some important e-mail communications is negligibly low. If misclassification cost values and accurate estimates of posterior probabilities are available, optimum decisions can be made by setting the decision threshold in the probability space to minimize the expected misclassification cost. Due to the practical problems in obtaining these, it typically is convenient to work with the Neyman-Pearson criterion by setting the limit on the maximum acceptable false positive rate or alternatively on the minimum acceptable precision.

Typically, a classifier returns a score proportional to its "confidence". In the case of Naïve Bayes, the score can be computed as:

$$score(d) = const + \sum_i f_i \cdot \log \frac{P(t_i|C)}{P(t_i|\overline{C})} \quad (1)$$

where the constant term captures the effect of class priors (e.g., which can be ignored if classification threshold is chosen based on a validation set). For the multi-nominal variant of Naïve Bayes, typically utilized in text applications, a summation on equation (1) can be carried out over the terms present in the document d (e.g., as opposed to all possible terms) and the value of $f_i$ corresponds to the frequency of occurrence of term $t_i$ in d. The occurrences of terms in d can be assumed to be independent given the class label and the class conditional probabilities $P(t_j|C)$ are estimated as $$P(t_j|C) = \frac{1 + \sum_{x_i \in C} f_{ij}}{V + \sum_j \sum_{x_i \in C} f_{ij}} \quad (2)$$

where $f_{ij} \geq 0$ is the number of occurrences of term $t_j$ in document $d_i$ and V is the vocabulary size. In equation (2) the Laplace technique can be applied to smooth the probability estimates. The multi-nominal model can be extended whereby the values $f_{ij}$ no longer have to correspond to in-document frequency but to a function thereof In particular, mapping $f_{ij}$ to a real-valued tfxidf weight (e.g., a statistical measure employed to evaluate the importance of a word has to a document in a collection of documents—the importance a word has in relation to a document typically increases proportionately depending on the number of times it appears in the document but this can generally be offset by the frequency that the word has in the collection) and additionally normalizing these features on a per-document basis so that the L2 norm of each feature vector is one.

During the tuning process of a classifier, a threshold can be chosen such that decisions with scores exceeding the threshold can be classified as "positive". In this context, the classifier's inability to perform well at a low enough false-positive rate can be seen as evidence of its overconfidence, whereby erroneous decisions are made with apparent high confidence. While this behavior can be observed in many learners, it is typically common for Naïve Bayes learners, due to the classifiers assumption of conditional independence of features given the class label. Although Naïve Bayes can generally have a reasonably low error rate, in some cases feature inter-correlations can be compounded resulting in overconfident predictions. This is generally true for long documents, which typically can be the reason why feature selection can have strong positive effects for this type of classifier.

Since feature inter-correlations are generally at the heart of the overconfidence problem for Naïve Bayes, a number of modifications to the learner can be effectuated in order to detect and counter such effects. Nevertheless, these adjustments typically tend to increase the complexity of model induction to a large extent, which can, for example, eliminate the key advantage of Naïve Bayes in practical applications (e.g., its scalability and ease of implementation). In some instances, however, such improvements can significantly improve Naïve Bayes' performance with a generally negligible increase in classifier complexity.

Supported by psychological evidence, for example, it has been found that document classification can be done fairly accurately by looking at only a small portion of the text. Indeed, document-specific feature selection that employs a small set of "important" words in a document can be shown to improve Naïve Bayes' performance significantly, especially in settings with highly skewed misclassification costs. However, document-specific feature selection that utilizes a small set of "important" words in a document is typically applied post-induction and thus is generally unable to take full advantage of the document-specific feature selection process. While being much simpler operationally (e.g., the selection of the optimum feature count can be applied without the potentially expensive retraining of the classifier), the technique can be suboptimal for some learners since these learners typically do not get a chance to induce a model over the reduced document representation, although for Naïve Bayes this approach can work quite well.

In accordance with an aspect, the claimed subject matter naturally extends the document-specific feature selection process so that it affects classifier induction. By doing so, the process can not only be more suitable for discriminative learners such as Support Vector Machines, but also more effective for Naïve Bayes itself. For purposes of comparison and not limitation the original and modified document-specific feature selection processes are outlined below.

| Document-Specific Feature Selection | |
| --- | --- |
| Post-Induction | Full Induction |
| 1. Train classifier | 1. Train classifier |
| 2. Rank feature weights | 2. Rank feature weights |
| 3. Use top-N features per document in evaluation | 3. Retain top-N features per training document |
| | 4. Retrain with the new representation |
| | 5. Use top-N features per document in evaluation |

Document-specific feature selection generally relies on the choice of a single cut-off parameter for all documents, regardless of their length and content. While this typically can be seen to regularize Naïve Bayes, it can be suboptimal for many documents, for example, those containing more numerous strongly relevant terms than suggested by the cut-off threshold. One possible way to address this issue can be to consider soft document-specific term weighting instead of hard feature selection, which can be decided by term frequency and a predefined cut-off threshold. While "pure" versions of the Naïve Bayes classifier can perform poorly when faced with large volumes of high dimensional data, the improvements and modifications as explicated and utilized by the subject matter as claimed can make Naïve Bayes competitive with state-of-the-art discriminative learners. One significant improvement of Naïve Bayes is the utilization of tfxidf feature weighting as well as L2 document length normalization to improve the performance of the classifier in text applications. Nevertheless, the claimed subject matter rather than employing L2 document length normalization utilizes an L1 norm that can be linked to the logarithmic opinion pooling framework of combining experts judgments.

Document representation based on using an L2 norm over the tfxidf features has been generally been used in Information Retrieval, as well as for text classifiers such as, for instance, Rocchio or linear Support Vector Machines. While it appears to help in improving Naïve Bayes performance, the justification for its use is rather weak. Using L2 norm makes sense in Information Retrieval where document similarity can often be expressed in terms of the cosine of the angle between document vectors (which for vectors having unit L2 norm is equivalent to their dot product). For Naïve Bayes for example, length normalization can reduce the influence of long documents in Naïve Bayes parameter estimation, but nevertheless it is generally unclear whether L2 norm is best for this purpose.

If it is assumed that a document d contains N terms, in the two-class context, the odds of the document belonging to the class C as opposed to $\overline{C}$ can be computed by multinomial Naïve Bayes as:

$$\frac{p(C|d)}{p(\overline{C}|d)} = \frac{p(C)}{1-p(c)} \frac{p(d|C)}{p(d|\overline{C})} = \frac{p(C)}{1-(p(C))} \prod_i \left(\frac{p(t_i|C)}{p(t_i|\overline{C})}\right)^{f_i}$$

where $f_i$ is the number of occurrences of term $t_i$ in d, with $\Sigma_i f_i = N$. Under the tf×idf weighting and L2 length normalization transform, the formula can typically be changed to:

$$\frac{p(C|d)}{p(\overline{C}|d)} = \frac{p(C)}{1-p(C)} \frac{p(d|C)}{p(d|\overline{C})} = \frac{p(C)}{1-p(C)} \prod_i \left(\frac{p(t_i|C)}{p(t_i|\overline{C})}\right)^{z_i} \quad (3)$$

where for each term $t_i$ contained in a document, $z_i$ is its normalized tf×idf weight factor, so that $z_i \geq 0$ and $\Sigma_i z_i^2 = 1$.

If $o_i = \frac{p(C|t_i)}{p(\overline{C}|t_i)}$ where $p(C|t_i) = \frac{p(t_i|C)}{p(t_i)} p(C)$ denotes the odds of term $t_i$ belonging to the target class rather than the anti-target, equation (3) can be expressed as:

$$\frac{p(C|d)}{p(\overline{C}|d)} = \frac{p(C)}{1-p(C)} \left(\frac{1-p(C)}{p(C)}\right)^{\Sigma_i z_i} \prod_i o_i^{z_i}$$

and if the document-length normalization is based on the L1 norm instead of L2, then $\Sigma_i z_i = 1$, which can yield:

$$\frac{p(C|d)}{p(\overline{C}|d)} = \prod_i o_i^{z_i}$$

Thus the posterior odds for a document can be a weighted geometric mean of the term-based odds for terms contained in a document. This type of formula combines probability distributions in the mixture of experts framework and is known as logarithmic opinion pooling. Under this interpretation, the terms found in a document can be considered as possibly correlated "experts", whose opinions are pooled or aggregated. The term weight $z_i$ can correspond to the relative reliability of expert i. If all experts are considered equally reliable, the posterior probability of the classifier can be computed as the geometric mean of the term-wise posteriors. In the log space this typically is equivalent to taking the arithmetic average of log-odds weights rather than just their sum as usually done for Naïve Bayes. Note that unlike Naïve Bayes, in mixtures-of-experts there generally is no assumption of the experts' mutual independence conditioned on the class label. Indeed, much research has been devoted to derive weight values $z_i$ able to take expert inter-correlation into account. Since odds are generally a measure of classifier confidence, taking the mean of individual opinions can be advantageous in that it typically cannot exceed the maximum of component odds (e.g., a document that contains only ambiguous terms generally cannot result in a highly confident decision). This is in contrast to the regular Naïve Bayes where the compounding effect of many weakly positive or negative features can give the appearance of very high overall confidence.

Different term weighting techniques besides the in-document term frequency have to date not been fully studied in the context of Naïve Bayes research. In light of this deficiency, the claimed subject matter can employ several term weighting mechanisms including the traditional unsupervised methods such as tf×idf and also supervised methods such as feature weights learned by models in the previous stage. Moreover, the claimed subject matter can utilize approaches that improve these term weightings such as combining the supervised and unsupervised approaches, and employing monotonic term weighting transformation using parameterized softmax functions.

Term weighting typically requires that each term appearing in a document receive a positive weight in order to emphasize attributes of likely importance and de-emphasize common and irrelevant ones. Some techniques can be based upon multiplicative combining of the in-document frequency with the inverse document frequency of the term in the training collection. Note that such a measure of term importance typically does not take into account class information, which can be relevant to categorization tasks. In the context of Text Categorization problems it can be advantageous to use supervised term weighting schemes that derive the weight from functions used in ranking features for selection, such as Information Gain or $\chi^2$. Although benefits can be shown for some datasets, overall such supervised weighting schemes are generally comparable to the ones based on traditional tf×idf approaches.

Nevertheless, it has been observed that the ranking of features derived from absolute weight values of certain linear classifiers can be competitive or superior to traditional feature ranking functions such as Information Gain, especially when applied in the context of the same learning algorithm. This suggests that the classifier itself can be effective at deriving feature ranking, and such is the case in the context of Naïve Bayes, where the ranking of features according to absolute weights assigned to them by the classifier:

$$ALO(t_i) = |\text{weight}(t_i)| = \left|\log \frac{P(t_i|C)}{P(t_i|\overline{C})}\right| \quad (4)$$

can be shown to outperform Information Gain-based ranking in document-specific feature selection. The use of ALO type weights for feature ranking in Naïve Bayes is also related to the asymmetric odds-ratio criterion:

$$OR(t_i, C) = \frac{P(t_i|C)}{1-P(t_i|C)} \cdot \frac{1-P(t_i|\overline{C})}{P(t_i|\overline{C})}$$

which typically works in terms of selecting relevant features for Naïve Bayes in text categorization.

Given that supervised and unsupervised term weighting approaches are typically based on different types of information, it is posited that a better overall weighting can be achieved by combining supervised and unsupervised weighting approaches together. For purposes of elucidation, the claimed subject matter can employ ALO (e.g., equation (4)) as the supervised component of a term weighting function, while retaining idf as the unsupervised component, for example, $$tw(t_i) = idf(t_i) \cdot ALO(t_i) \quad (5)$$

Nevertheless, other term weighting functions can be used in place of ALO and idf and, indeed, more than two measures can be incorporated into an aggregate term weighting function that can combine several measures of reliability. For instance, a multiplicative scheme that, given N weighting functions, computes the combined term weight for term i in document d as:

$$tw(t_i) = \prod_{j=1\ldots N} f_j(t_i, d) \quad (6)$$

can be utilized, where $f_j(x_i, d) > 0$ represents the term weight assigned by the j-th function.

Computing term weights utilizing equation (5) can involve the following illustrative two-step induction process:

1. A mixture-of-experts variant of Naïve Bayes classifier is built using the original feature representation
2. The absolute weight values are incorporated into the term weighting function
3. A second mixture-of-experts variant of Naïve Bayes classifier is built using the modified document representation It should be noted without limitation that document-specific feature selection and term weighting can also be performed at the same time. Also, the aforementioned process can continue beyond the first two models, with a compounding effect of importance weights produced by the consecutive classifiers. Nevertheless, it is likely that the weights of the individual Naïve Bayes classifiers will generally be highly correlated, thus providing little rationale for continuing with the procedure beyond the first two models.

If document length normalization is not performed, for linear classifiers the score function is typically symmetrical with respect to classifier weights and term weights, for instance, $$\text{score} = b + \sum_i tw_i \cdot w_i \quad (7)$$

Usually the term weights are fixed and the parameter vector, w, optimized. Nevertheless, their roles can be reversed and, for a fixed w, optimize the term weights, especially when the in-document term frequency is not taken to be part of the weighting function. Typically, while term weights can be assumed to be non-negative, this requirement can be dropped. Naïve Bayes in effect can be utilized as a "term weighting" function for the more expensive algorithms, although since the term weights can take negative values this can be considered an "unorthodox" method of applying term weights. As such, these techniques can be evaluated from the standpoint of whether Naïve Bayes term weighting provides a better or worse performance for the target algorithm (e.g., linear Support Vector Machines) when compared to the native document representation or an alternative form of term weighting.

Document length normalization can introduce nonlinearity that breaks the symmetry between term weights and classifier weights as exemplified in equation (7). It can also make term weights document-specific, while maintaining their relative relationship (e.g., the ratio of any two weights before and after normalization can remain the same). Joint optimization of classifier weights and term weights however is possible, but is generally difficult due to the size of the parameter space. Term weighting typically works with many more choices than feature selection, which itself can be viewed as a hard problem. That said however, the set of potential choices can nonetheless be meaningfully constrained by the initial choice of the term weighting function. The good performance of feature selection functions in supervised term weighting suggests that these functions are not only useful in determining feature ranking but also in their relative importance. It is also possible that the importance values are suboptimal for a given classification task. It should be noted that any two feature selection functions that rank terms in the same order can behave differently when considered as term weighting functions. In particular, they can have different steepness as a function of rank, with steeper functions highly emphasizing the strongest terms and being analogous to aggressive document-specific feature selection. In contrast, flatter functions can favor document classification with significant contribution from a larger set of a document's features, which typically can be analogous to mild document-specific feature selection. For any two equivalent ranking functions, for instance, it can be difficult to stipulate a priori which one is more suitable for term weighting in a particular learning method, which suggests that their quality needs to be assessed via classification performance of the resulting classifier.

Accordingly, if it is assumed that the initial ranking of features is $$\text{rank}(t_1) \leq \ldots \leq \text{rank}(t_N)$$

and further assuming that ranking of features is maintained, the search for optimum feature weightings can be formulated as finding a set of values $$tw(t_1) \geq \ldots \geq tw(t_N) \geq 0$$

such that the performance of a given learning method built over such document representation is maximized. Nevertheless, even with such monotone constraints, optimizing for both classifier parameters and term weights can be difficult. Therefore, a parameterized monotonic transform of the original term weights $$f(\alpha, x): x_1 \geq x_2 \Rightarrow f(\alpha, x_1) \geq f(\alpha, x_2)$$

can be considered, for which the best parameter settings can be determined using a validation set. For a fixed ranking function, for example, one can consider a parameterized monotonic transformation of x that preserves term ranking, but also allows one to control the steepness of the mapping via parameter $\alpha > 0$. For purposes of exposition and not limitation, the claimed subject matter can use a parameterized version of the softmax function. Given a set of values $\{x_i: i=1 \ldots N\}$ the softmax function can transform them as:

$$\text{softmax}(x_i) = \frac{\exp(\alpha \cdot x_i)}{\sum_j \exp(\alpha \cdot x_j)} \quad (8)$$

This normalization can be applied on a per-document basis. For large values of α, equation (8) can approximate the case of classifying with just a single "most important" feature, while for low values of the parameter can be considered equivalent to treating all term weights as equal. This generally captures the intent of document-specific term weighting, although as one of ordinary skill will appreciate other forms of transforming the feature ranking function can be utilized. Also in the context of Naïve Bayes applied to large amounts of data, where speed and scalability are key it can seem counterintuitive to employ an optimization process for term weighting that can be more expensive than the process of inducing Naïve Bayes itself In this sense, evaluating the impact of equation (8) over a small set of α can be acceptable and similar in complexity to a search for an optimum smoothing parameter for estimating individual probabilities.

FIG. 1 illustrates a system 100 implemented on a machine that effectuates and facilitates improving Naïve Bayes performance in text applications demanding high precision in accordance with an aspect of the claimed subject matter. System 100 can include interface component 102 (hereinafter referred to as "interface 102") that can receive one or more documents (e.g., email, text files, word processing files, spreadsheet files, graphical files, audio/visual files, and the like). Further, interface 102 in this illustrative aspect of the claimed subject matter can disseminate a score determined by analysis component 104, for instance. Utilization of the score ascertained by analysis component 104 and distributed by interface 102 can depend on the application to which the score is applied. For instance, in a classification application the score determined by analysis component 104 can be compared to a threshold in order to make a binary decision. For example, in the case of spam filtering, whether or not received email is spam.

Interface 102 can provide various adapters, connectors, channels, communication pathways, etc. to integrate the various components included in system 100 into virtually any operating system and/or database system and/or with one another. Additionally, interface 102 can provide various adapters, connectors, channels, communication modalities, etc., that can provide for interaction with various components that can comprise system 100, and/or any other component (external and/or internal), data, and the like, associated with system 100.

Analysis component 104 upon receipt of documents arriving in a document stream from interface 102, for example, can extract features (e.g., words) from the incoming documents and provide a set of features (e.g., a set of words). The set of words can then be utilized to generate or construct a feature vector (e.g., a vector of numbers corresponding to features that have been used in training). In order to generate the feature vector, analysis component 104 can for each feature look at whether or not the feature has been used in training (e.g., determine whether there is something known about the feature under scrutiny). If the feature has previously been employed in training, the feature can be mapped to a numeric identifier, for example. Where the feature has not previously been used during training the feature can be discarded. Once the feature vector has been constructed, analysis component 104 can apply a transformation to the generated feature vector, for example, that provides the feature vector in a form acceptable to and implementable by a downstream classification technique. For example, in accordance with an illustrative aspect, analysis component 104 can take the vector, for each feature in the received vector look at the weights of the classifier assigned to each feature, sum up all the weights and divide the sum of the weighs by the features present in the supplied vector. The sum of all the weights divided by the features present can be utilized as a score of the classifier which can then be compared with a decision threshold, for instance. Accordingly, where the score exceeds the decision threshold associated features can be classified as "class A"; conversely where the score falls below the decision threshold, associated features can be categorized as falling within "class B".

In a further aspect of the claimed subject matter, analysis component 104 can also apply other transformations prior to ascertaining a score. For example, instead of summing up all the weights present in the supplied feature vector, analysis component 104 can provide a weighted sum where each of the weights in the feature vector can be multiplied by a term weight. The term weight typically can have two components, the term weight itself and a normalization component. The normalization component of the term weight can typically be utilized to make certain that the term weights actually represent a unit vector according to a norm. For example, an L1 norm rather than the Euclidian norm that typically is employed for this purpose. Once again upon summation of the classifier weights multiplied by term weights a score can be provided by analysis component 104 which can then be compared with a decision threshold and appropriate classification undertaken.

Figure 2:
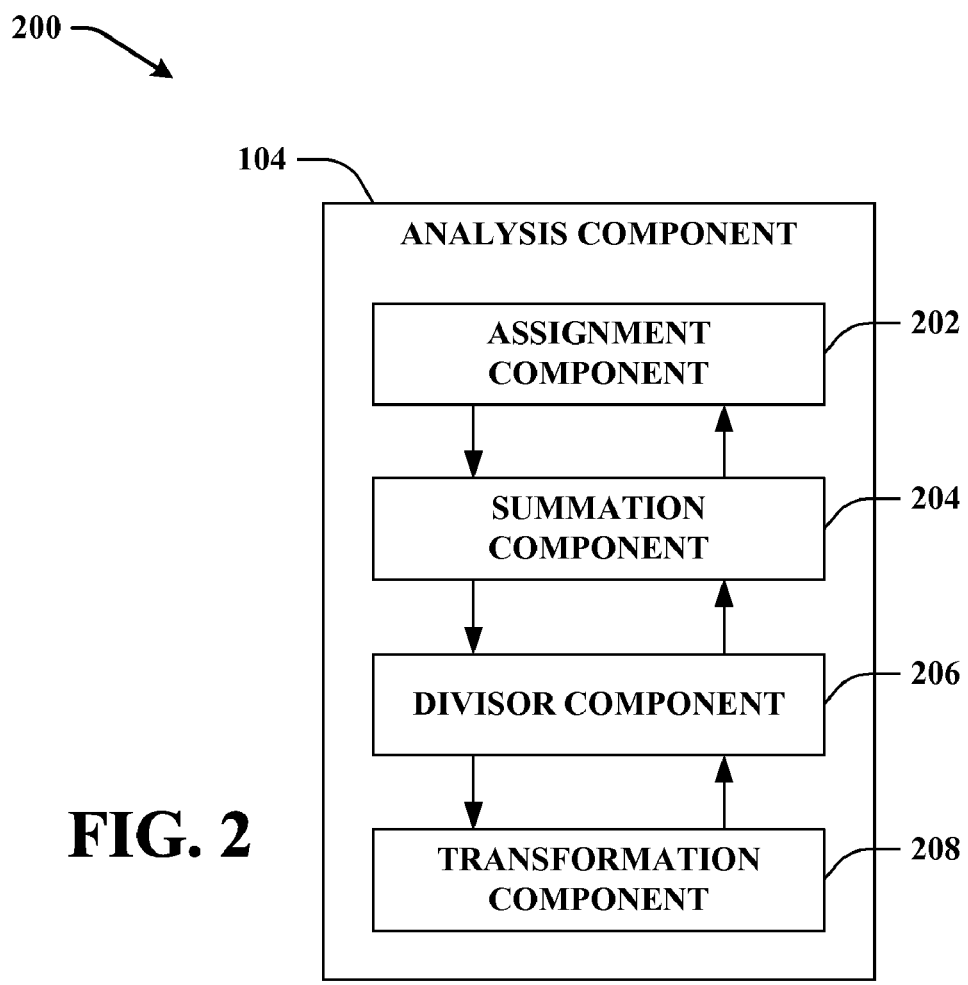
FIG. 2 provides a more detailed depiction of an illustrative analysis component in accordance with an aspect of the claimed subject matter.

FIG. 2 provides further illustration 200 of analysis component 104 in accordance with an aspect of the claimed subject matter. As exemplified in FIG. 2 analysis component 104 can undertake L1 normalization of term weights in accordance with the claimed subject matter and can include assignment component 202 that can associate term weights to features. Term weights can be pre-specified or alternatively and/or additionally can be derived from training collections (e.g., tfxidf based). Where multi-stage learning is employed term weights can also be the result from running previous iterations. It should be noted that term weights are typically assumed to be non-negative, but as will be appreciated by those conversant in this field of endeavor, the claimed subject matter is not so limited. Additionally, analysis component 104 can also include summation component 204 that for each document received aggregates the term weights associated with the document to provide the document's norm (e.g., L1 norm) and divisor component 206 that for each feature in the document the feature's term weight can be divided by the document's term norm (e.g., L1 norm) which becomes the feature's new term weight. Additionally, analysis component 104 can include transformation component 108 that constructs a model based at least in part on the final term weight representation. Moreover, transformation component 208 can apply the same transformation when using the model with previously unseen data.

Figure 3:
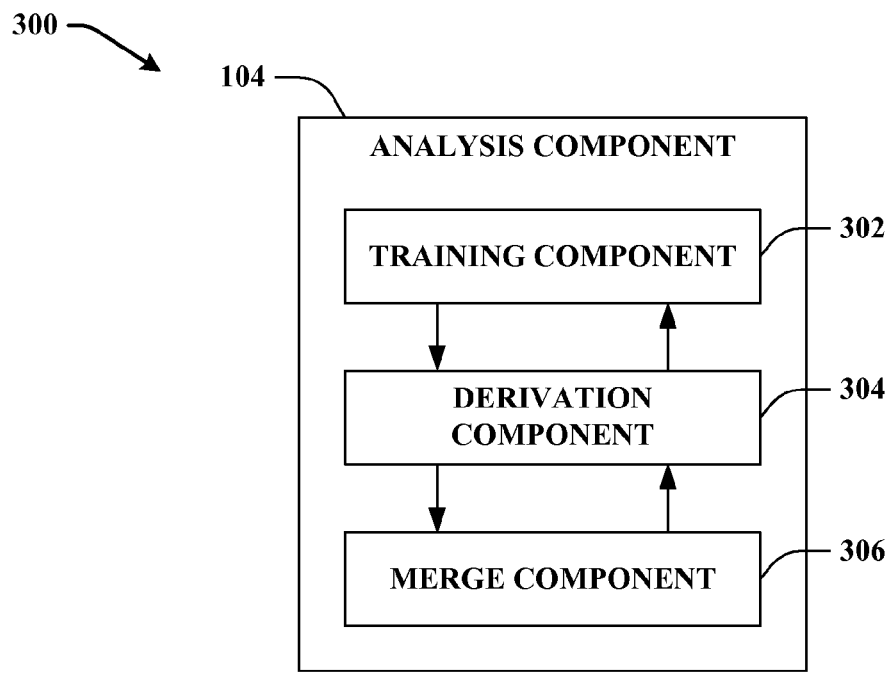
FIG. 3 provides a more detailed depiction of an illustrative analysis component in accordance with a further aspect of the claimed subject matter.

FIG. 3 provides yet further illustration 300 of analysis component 104 in accordance with another aspect of the claimed subject matter. As depicted in FIG. 3 analysis component 104 can provide inductive term weight optimization and can include training component 302 that can train Naïve Bayesian models utilizing a given document representation. Further, analysis component 104 can also include derivation component 304 that can derive term importance from the current model and merge component 306 that can merge previous and derived (e.g., new) term importance weights.

Figure 4:
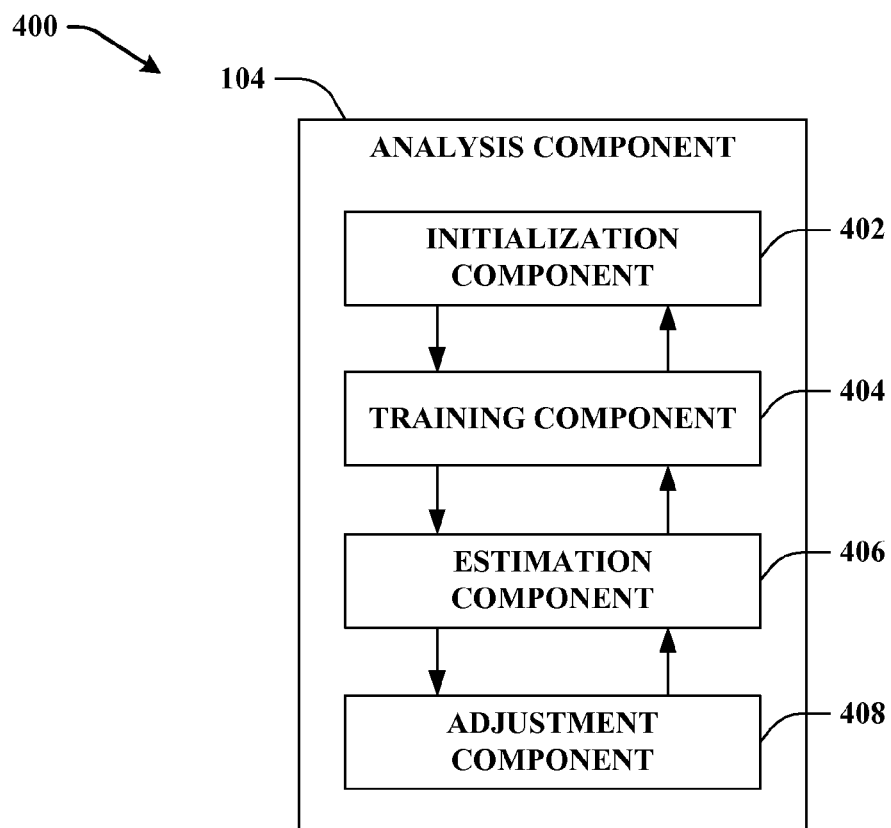
FIG. 4 provides a further detailed depiction of an analysis component in accordance with an aspect of the claimed subject mater.

FIG. 4 depicts another aspect 400 of analysis component 104 in accordance with the claimed subject matter. As illustrated, analysis component 104 can provide rank preserving term weight optimization and can include initialization component 402 that can set initial performance to 0. Additionally, analysis component 104 can include training component 404 that, like training component 302, can train Naïve Bayes models using a given document representation. In addition, analysis component 104 can include estimation component 406 that can estimate the performance of the Naïve Bayes model based at least in part on an evaluation set. Where estimation component 406 determines that performance of the model is better than previous models, estimation component 406 can direct analysis component 104 to maintain the current document representation, update the current performance and indicate to adjustment component 408 to adjust the term weights such that their order is preserved and so that the expected performance with the new representation is better than the current one.

Figure 5:
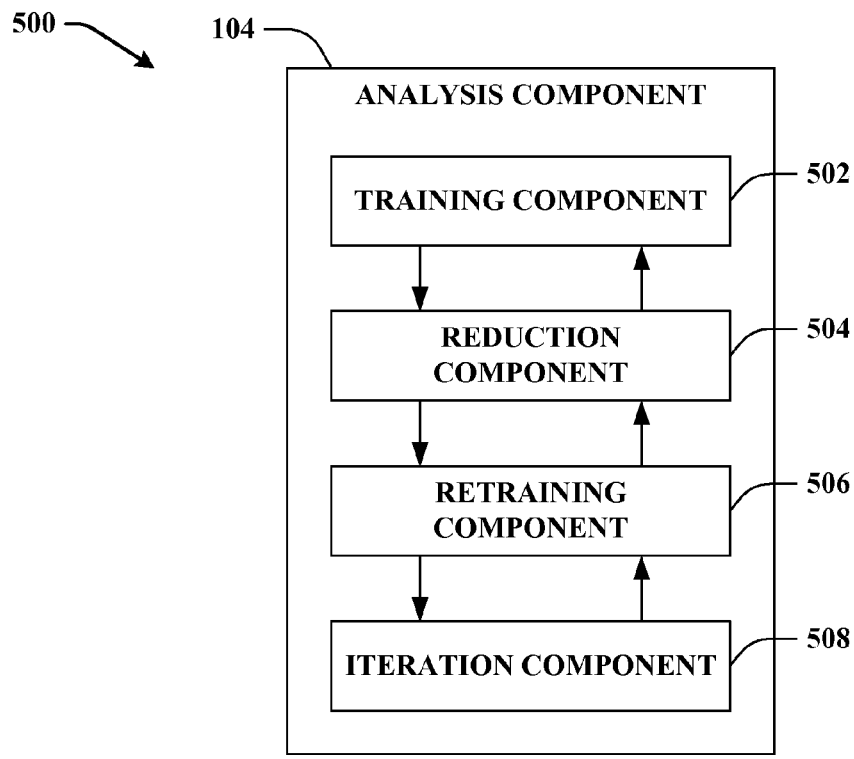
FIG. 5 provides yet another more detailed depiction of an analysis component in accordance with an aspect of the claimed subject matter.

FIG. 5 illustrates a further aspect 500 of analysis component 104 in accordance with the subject matter as claimed. Analysis component 104 can include training component 502 that like training components 302 and 404 can train Naïve Bayes models using given document representations. Analysis component 104 can also include reduction component 504 that can reduce each document to using the top-N features (e.g., reduction component 504 can use the current model to estimate weight relevance). Moreover, analysis component 104 can also include retraining component 506 that uses the reduced representation provided by reduction component 504 to retain the model and apply the retrained model to evaluation data, and iteration component 508 that permutes the document features thus providing different choices of N and maintains solutions that result in the best estimated performances.

In view of the exemplary systems shown and described supra, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

Figure 6:
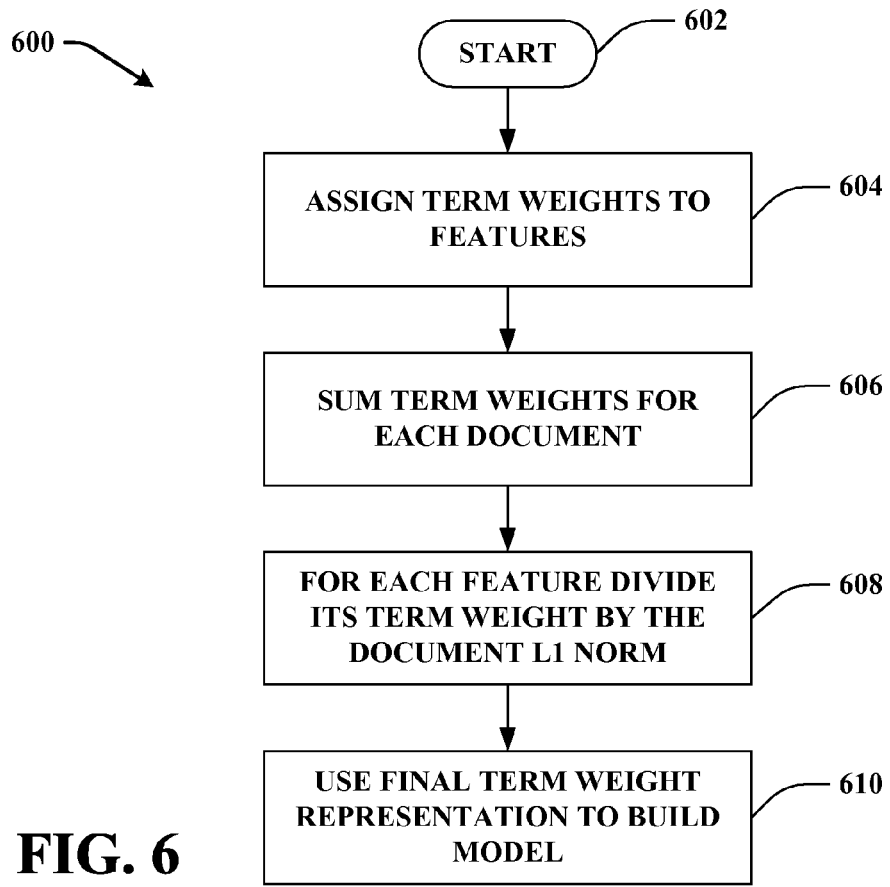
FIG. 6 illustrates a flow diagram of a machine implemented methodology that effectuates and facilitates normalization of term weights in accordance with an aspect of the subject matter as claimed.

FIG. 6 illustrates a machine implement methodology 600 that effectuates and facilitates normalization of term weights in accordance with an aspect of the claimed subject matter. Method 600 can commence at 602 at which point various and sundry initialization tasks and processes can be initiated upon completion of which the method can proceed to 604. At 604 term weights can be assigned to features. Term weights can be pre-specified or can be derived from training collections (e.g., tfxidf based). Additionally, where multi-stage learning is implemented term weights can result from previous iterations of a constructed model. At 606 term weights for each document can be summed or aggregated to provide each document's L1 norm, and at 608 each document's feature's term weight can be divided by the document's L1 norm thus providing a new term weight for the feature at issue. At 608 a model can be constructed using a final term weight representation. The same transformation can be applied when using the model with previously unseen data.

Figure 7:
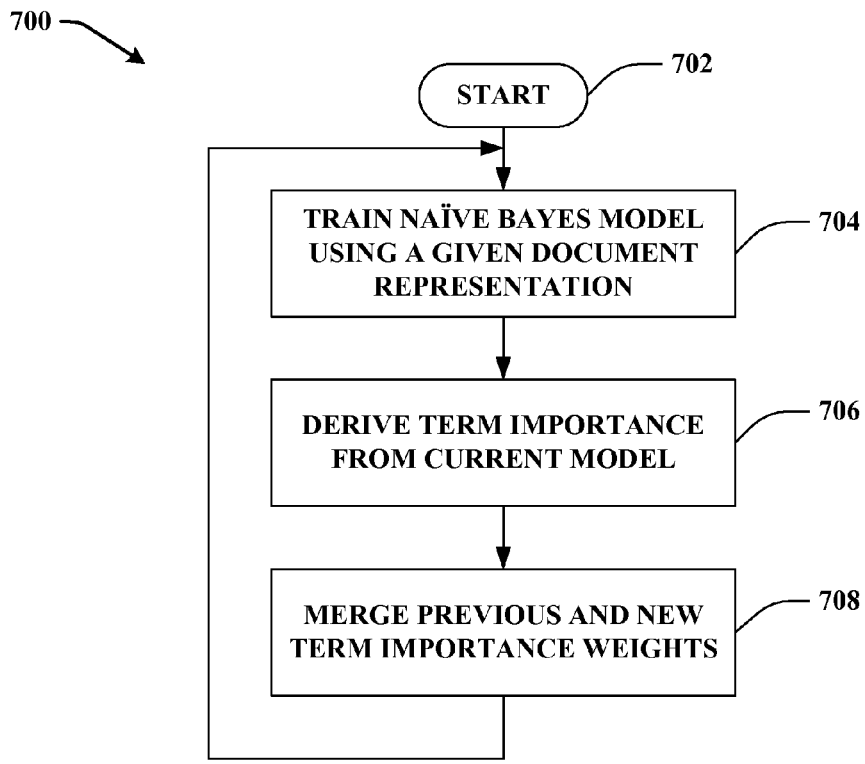
FIG. 7 depicts a further flow diagram of a machine implemented method that effectuates and facilitates inductive term weight optimization in accordance with an aspect of the claimed subject matter.

FIG. 7 depicts a further illustrative methodology 700 that effectuates and facilitates inductive term weight optimization in accordance with an aspect of the claimed subject matter. At 702 various initialization tasks and processes can be undertaken upon completion of which method 700 can proceed to 704. At 704 supplied document representations can be utilized to train a Naïve Bayes model, and at 706 term importance can be derived from the current model. At 708 previous and new term importance weights can be merged after which the methodology can cycle back to 704.

Figure 8:
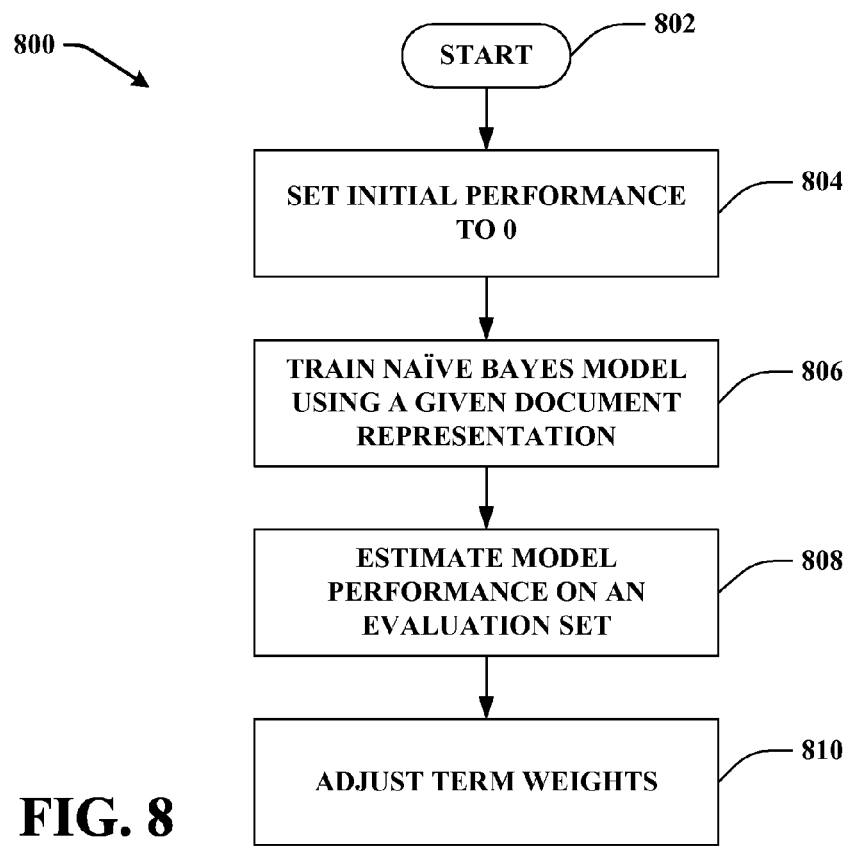
FIG. 8 illustrates another methodology that facilitates and effectuates rank preserving term weight optimization in accordance with an aspect of the claimed subject mater.

FIG. 8 provides illustration of a further methodology 800 that facilitates and effectuates rank preserving term weight optimization in accordance with an aspect of the claimed subject mater. At 802 initialization processes can be performed after which method 800 can proceed to 804. At 804 initial performance can be set to 0 at which point, at 806, a Naïve Bayes model can be trained using a given document representation. At 808 the performance of the trained Naïve Bayes model can be estimated through utilization of an evaluation set. At this stage if performance of the trained model exceeds that of previous model instances, the current document representation is maintained and the current performance updated. At 810 term weights can be adjusted such that their order is preserved and so that the expected performance with the new representation is better than the current one.

Figure 9:
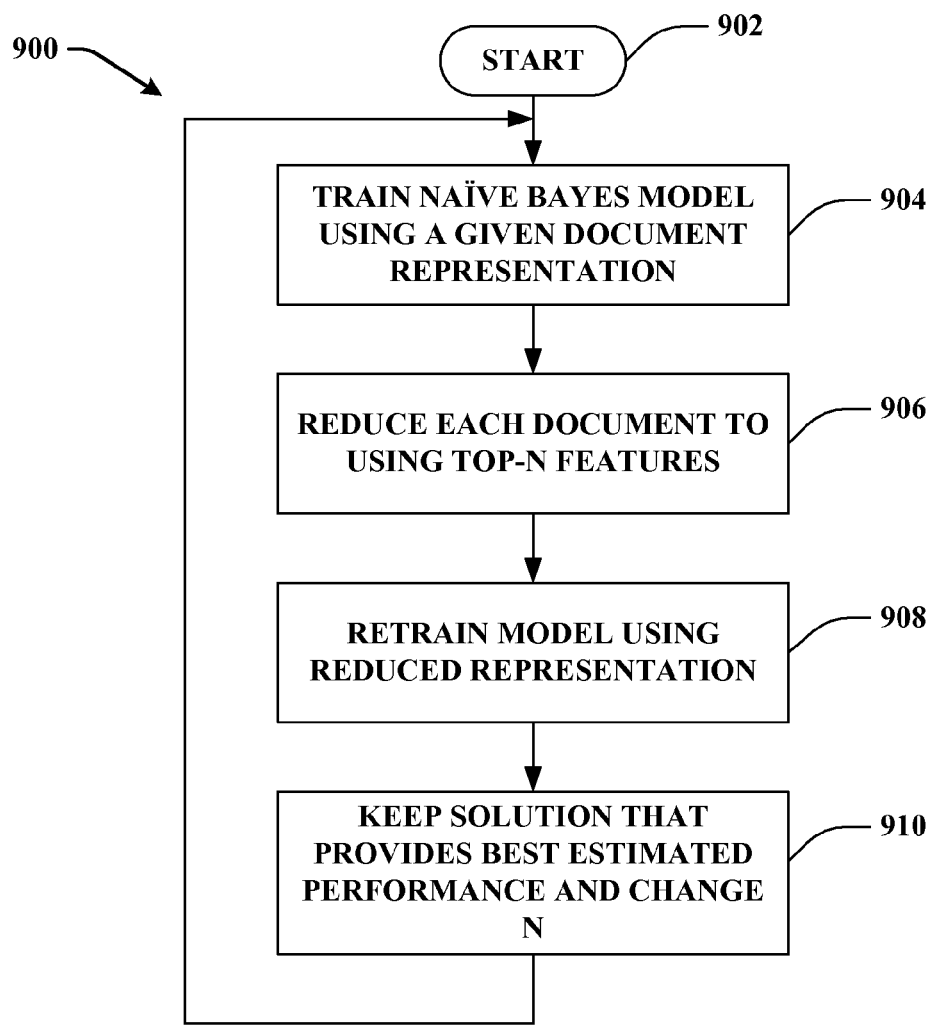
FIG. 9 depicts an illustrative methodology that facilitates and effectuates inductive document-specific feature selection in accordance with an aspect of the claimed subject matter.

FIG. 9 depicts an illustrative methodology 900 that facilitates and effectuates inductive document-specific feature selection in accordance with an aspect of the claimed subject matter. At 902 various initialization tasks can be performed after which methodology 900 can proceed to 904. At 904 given a document representation a Naïve Bayes model can be trained based at least in part on the document representation. At 906 each document can be reduced to using the top-N features (e.g., the current model can be used to help estimate weight relevance). At 908 the model can be retrained using the reduced representation and the retrained model applied against evaluation data. At 910 the solution that results in the best estimated performance can be maintained while different choices of N can be made wherein with each different choice the method returns back to 904 to further train the Naïve Bayes model.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
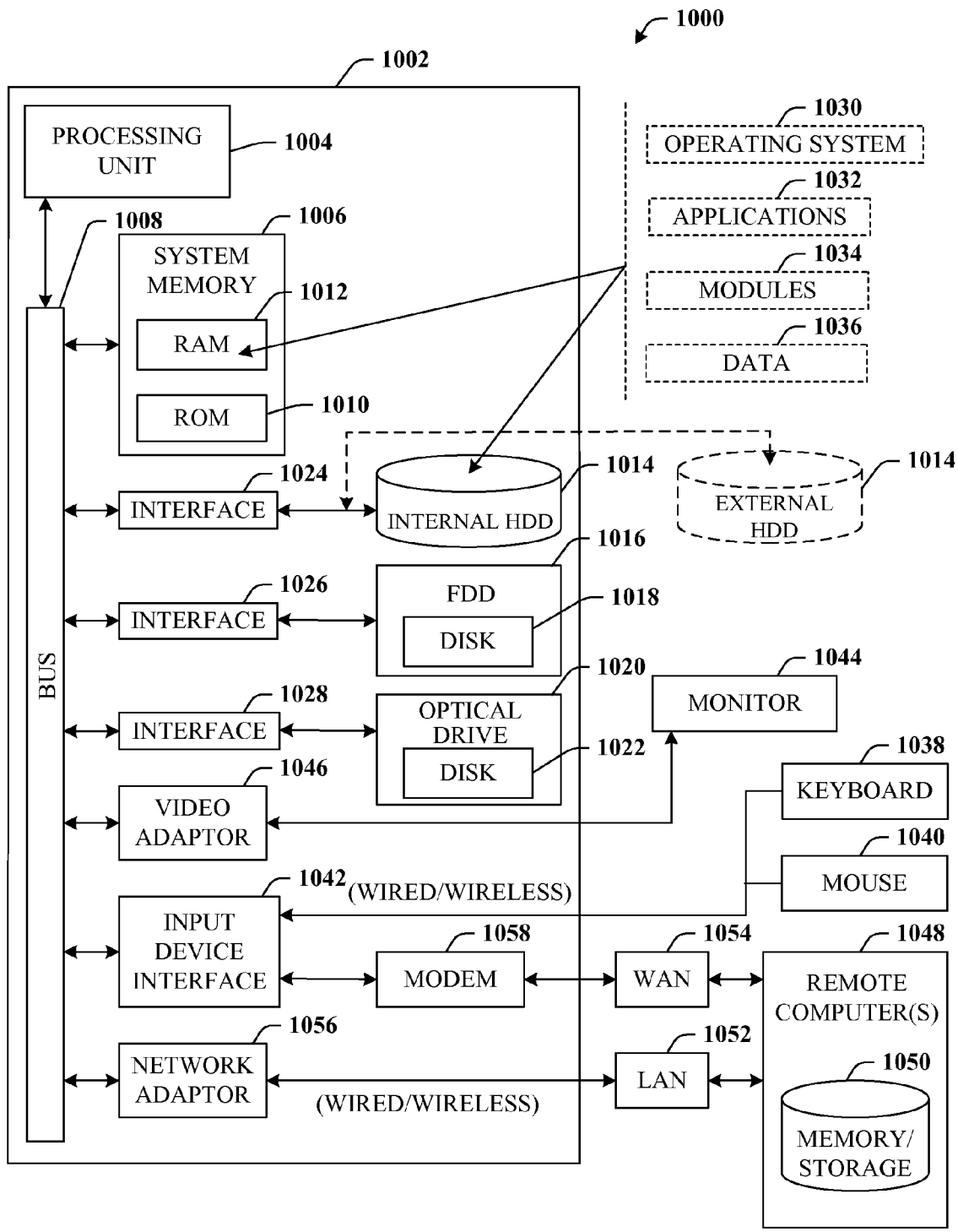
FIG. 10 illustrates a block diagram of a computer operable to execute the disclosed system in accordance with an aspect of the claimed subject matter.

Referring now to FIG. 10, there is illustrated a block diagram of a computer operable to execute the disclosed system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11 a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 11:
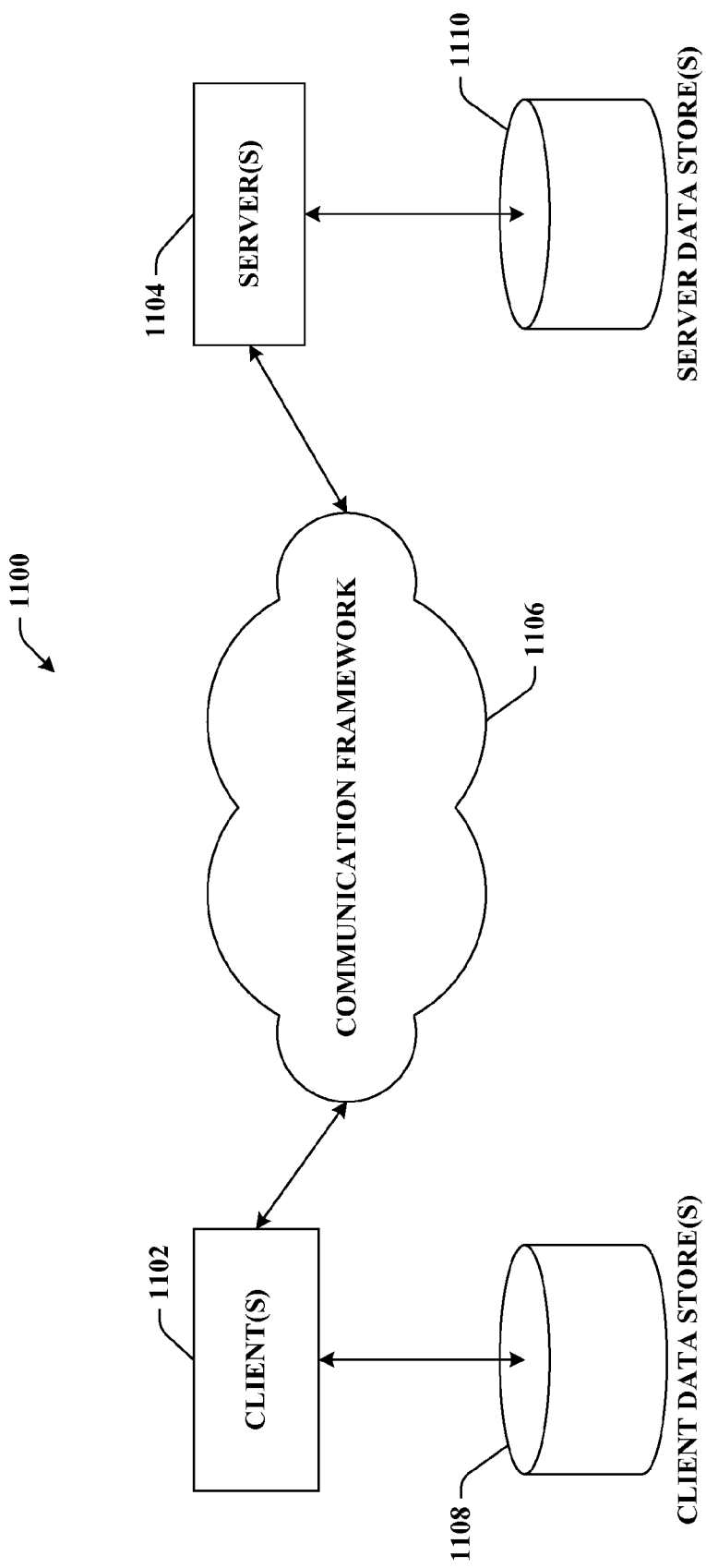
FIG. 11 illustrates a schematic block diagram of an exemplary computing environment for processing the disclosed architecture in accordance with another aspect.

Referring now to FIG. 11, there is illustrated a schematic block diagram of an exemplary computing environment 1100 for processing the disclosed architecture in accordance with another aspect. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system implemented on a machine that effectuates and facilitates normalization of document representation for use with a Naïve Bayes model, comprising:

a component that receives a document from an interface, the component determines a norm associated with the document by aggregating absolute term weight values associated with the document and ascertains a term weight for a feature associated with the document, the component divides the term weight for the feature associated with the document with the norm associated with the document to produce a normalized document representation.

2. The system of claim 1, the normalized document representation employed to train the Naïve Bayes model.

3. The system of claim 2, the trained Naïve Bayes model utilizes the normalized document representation against new data.

4. The system of claim 1, the term weight for the feature at least one of pre-specified or derived from a training collection.

5. The system of claim 1, the term weight for the feature derived from a previous iteration of the Naïve Bayes model.

6. The system of claim 1, the component utilizes the normalized document representation to build the Naïve Bayes model.

7. The system of claim 1, the term weight for the feature associated with the document multiplied by the absolute term weight values associated with the document.

8. A method implemented on a machine that effectuates and facilitates normalization of document representation for use with a Naïve Bayes model, comprising:

aggregating absolute term weight values associated with a document to determine a norm associated with the document;

determining a term weight for a feature associated with the document; and producing a normalized document representation based at least in part on dividing the term weight for the feature associated with the document with the norm associated with the document.

9. The method of claim 8, further comprising utilizing the normalized document representation to train the Naïve Bayes model.

10. The method of claim 9, further comprising applying the trained Naïve Bayes model to new data.

11. The method of claim 8, further comprising obtaining the term weight for the feature from a previous iteration of the Naïve Bayes model.

12. The method of claim 8, further comprising deriving the term weight for the feature from a training collection.

13. The method of claim 8, further comprising constructing the Naïve Bayes model based at least in part on the normalized document representation.

14. The method of claim 8, further comprising multiplying the term weight for the feature associated with the document together with the absolute term weight values associated with the document, the product of the multiplying aggregated to provide the norm.

15. A system that facilitates and effectuates normalization of document representation, comprising:

means for summing absolute term weight values associated with a document to determine a norm associated with the document;

means for determining a term weight for a feature associated with the document;

means for producing a normalized document representation based at least in part on dividing the term weight for the feature associated with the document with the norm associated with the document, and means for optimizing non-negative term weights under a rank preserving constraint comprising: means for acquiring a term weight.

16. The system of claim 15, further comprising means for training a Naïve Bayes model based at least in part on the normalized document representation.

17. The system of claim 15, further comprising means for ascertaining the term weight for the feature from a previous iteration of a Naïve Bayes model.

18. The system of claim 15, further comprising means for determining the term weight for the feature from a training collection.

19. The system of claim 15, the means for optimizing non-negative term weights under a rank preserving constraint, further comprising:
means for at least one of learning a model;
means for evaluating the model; and
means for adjusting the term weight of the model based at least in part on the rank preserving constraint.

20. The system of claim 15, further comprising means for obtaining the norm through multiplication of the term weight for the feature associated with the document and the absolute term weight values associated with the document.

* * * * *